US012761583B2

(12) United States Patent
Tamaki et al.

(10) Patent No.: US 12,761,583 B2
(45) Date of Patent: Oct. 13, 2026

(54) DEVELOPMENT DEVICE AND IMAGE FORMING APPARATUS THEREWITH

(71) Applicant: KYOCERA Document Solutions Inc., Osaka (JP)

(72) Inventors: Tomohiro Tamaki, Osaka (JP); Katen Ko, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/169,509

(22) Filed: Apr. 3, 2025

(65) Prior Publication Data

US 2025/0314990 A1 Oct. 9, 2025

(30) Foreign Application Priority Data

Apr. 9, 2024 (JP) ................................ 2024-062758

(51) Int. Cl.
*G03G 15/09* (2006.01)
*G03G 15/08* (2006.01)

(52) U.S. Cl.
CPC ..... *G03G 15/0921* (2013.01); *G03G 15/0891* (2013.01); *G03G 15/0898* (2013.01);
(Continued)

(58) Field of Classification Search
CPC ........... G03G 15/0891; G03G 15/0893; G03G 15/0898; G03G 15/0921; G03G 15/0942;
(Continued)

(56) References Cited

U.S. PATENT DOCUMENTS

2006/0239723 A1* 10/2006 Okuda ............... G03G 15/0891 399/272
2009/0169264 A1 7/2009 Miyoshi et al. .............. 399/254
(Continued)

FOREIGN PATENT DOCUMENTS

JP 2010-066377 A 3/2010

OTHER PUBLICATIONS

Extended European Search Report mailed Aug. 14, 2025, issued to European Application No. 25168423.9.

*Primary Examiner* — Carla J Therrien
(74) *Attorney, Agent, or Firm* — Stein IP, LLC

(57) ABSTRACT

A development device includes a developer container having a first conveyance chamber and a second conveyance chamber above it, a first stirring-conveyance member, a second stirring-conveyance member, a developer carrying member, and a regulation blade. The developer carrying member includes a magnetic member having a regulation pole, a main pole, a release pole, and an attracting pole. A release start position at which the magnetic flux density of the release pole becomes 5 [mT] or less is below a straight line L1 horizontally passing through the center of a rotation shaft of the second stirring-conveyance member and when the central angle of a developer releasing region where the magnetic flux density between the release pole and the attracting pole is 5 [mT] or less is represented by X [°] and the peak magnetic flux density of the attracting pole is represented by Y [mT], $Y \leq 2.1X - 32.7$ is satisfied.

7 Claims, 3 Drawing Sheets

(52) U.S. Cl.
CPC ..... *G03G 15/0893* (2013.01); *G03G 15/0942* (2013.01); *G03G 2215/0819* (2013.01); *G03G 2215/0822* (2013.01); *G03G 2215/0827* (2013.01); *G03G 2215/0838* (2013.01)

(58) Field of Classification Search
CPC ... G03G 2215/0819; G03G 2215/0822; G03G 2215/0827; G03G 2215/0838
See application file for complete search history.

(56) References Cited

U.S. PATENT DOCUMENTS

| | | | | |
|---|---|---|---|---|
| 2010/0202805 | A1* | 8/2010 | Miyoshi | G03G 15/0921 399/277 |
| 2012/0051798 | A1* | 3/2012 | Kunihiro | G03G 15/0812 399/277 |
| 2015/0168865 | A1* | 6/2015 | Morimoto | G03G 15/0808 399/274 |
| 2018/0074441 | A1 | 3/2018 | Okuyama | G03G 15/0921 |
| 2020/0142333 | A1 | 5/2020 | Takeuchi | G03G 15/0889 |

* cited by examiner

DEVELOPMENT DEVICE AND IMAGE FORMING APPARATUS THEREWITH

INCORPORATION BY REFERENCE

This application is based on and claims the benefit of priority from Japanese Patent Application No. 2024-062758 filed on Apr. 9, 2024, the contents of which are hereby incorporated by reference.

BACKGROUND

The present disclosure relates to a development device and an image forming apparatus including the same. The present disclosure relates to in particular a development device including a first conveyance chamber in which a stirring-conveyance member that stirs and conveys developer is disposed, and a second conveyance chamber disposed above the first conveyance chamber, and also to an image forming apparatus including the same.

In image forming apparatuses, a latent image formed on an image carrying member composed of a photosensitive member or the like is developed by a development device to be visualized as a toner image. Some known development devices include a developer container for storing developer, a first and a second stirring-conveyance member for stirring and conveying the developer, and a development roller (developer carrying member) for carrying the developer supplied from the second stirring-conveyance member. The first stirring-conveyance member conveys developer to one side of the development roller along its axial direction and the second stirring-conveyance member supplies developer to the development roller while conveying it to the other side (opposite from the one side).

Incidentally, in these days, there is increasing demand for size reduction of image forming apparatuses. In particular, in color-printing models, which incorporates a plurality of development devices, size reduction of the development device is desired. To cope with this, a development device is known that includes a first conveyance chamber in which a first stirring-conveyance member is disposed and a second conveyance chamber disposed above the first conveyance chamber and in which a second stirring-conveyance member is disposed. In such a development device, disposing the first and second conveyance chamber one above the other allows size reduction of the development device in the horizontal direction as compared with the configuration where the first and second conveyance chambers are disposed horizontally. It is thus possible to reduce the space for the development device and to reduce the size of image forming apparatuses.

SUMMARY

According to one aspect of the present disclosure, a development device includes a developer container, a first stirring-conveyance member, a second stirring-conveyance member, a developer carrying member, and a regulation blade. The development device develops an electrostatic latent image formed on an image carrying member into a toner image. The developer container includes a first conveyance chamber and a second conveyance chamber disposed above the first conveyance chamber across a partition portion and stores two-component developer containing carrier and toner. The first stirring-conveyance member is rotatably supported in the first conveyance chamber and conveys, while stirring, developer in the first conveyance chamber in a first direction. The second stirring-conveyance member is rotatably supported in the second conveyance chamber parallel to the first stirring-conveyance member and conveys, while stirring, developer in the second conveyance chamber in a second direction opposite to the first direction. The developer carrying member is rotatably supported on the developer container and carries on its surface the developer in the second conveyance chamber. The regulation blade is disposed opposite the developer carrying member and regulates the layer thickness of the developer on the developer carrying member. The development device carries out the feeding of the developer to the developer carrying member and the collection of the developer from the developer carrying member in the second conveyance chamber. The developer carrying member includes a development sleeve that is rotatable and that is in a cylindrical shape, and a magnetic member that is fixed inside the development sleeve so as not to be rotatable and that has, along the rotation direction of the development sleeve, a plurality of magnetic poles including a regulation pole opposite the regulation blade, a main pole opposite the image carrying member, a release pole releasing developer carried on the developer carrying member, and an attracting pole attracting developer onto the developer carrying member. A release start position at which the magnetic flux density of the release pole becomes 5 [mT] or less is below a straight line L1 horizontally passing through the center of a rotation shaft of the second stirring-conveyance member and, when the central angle of a developer releasing region where the magnetic flux density between the release pole and the attracting pole is 5 [mT] or less is represented by X [° ] and the peak magnetic flux density of the attracting pole is represented by Y [mT], formula (1) below is satisfied.

$$Y \leq 2.1X - 32.7 \tag{1}$$

DETAILED DESCRIPTION

Figure 1:
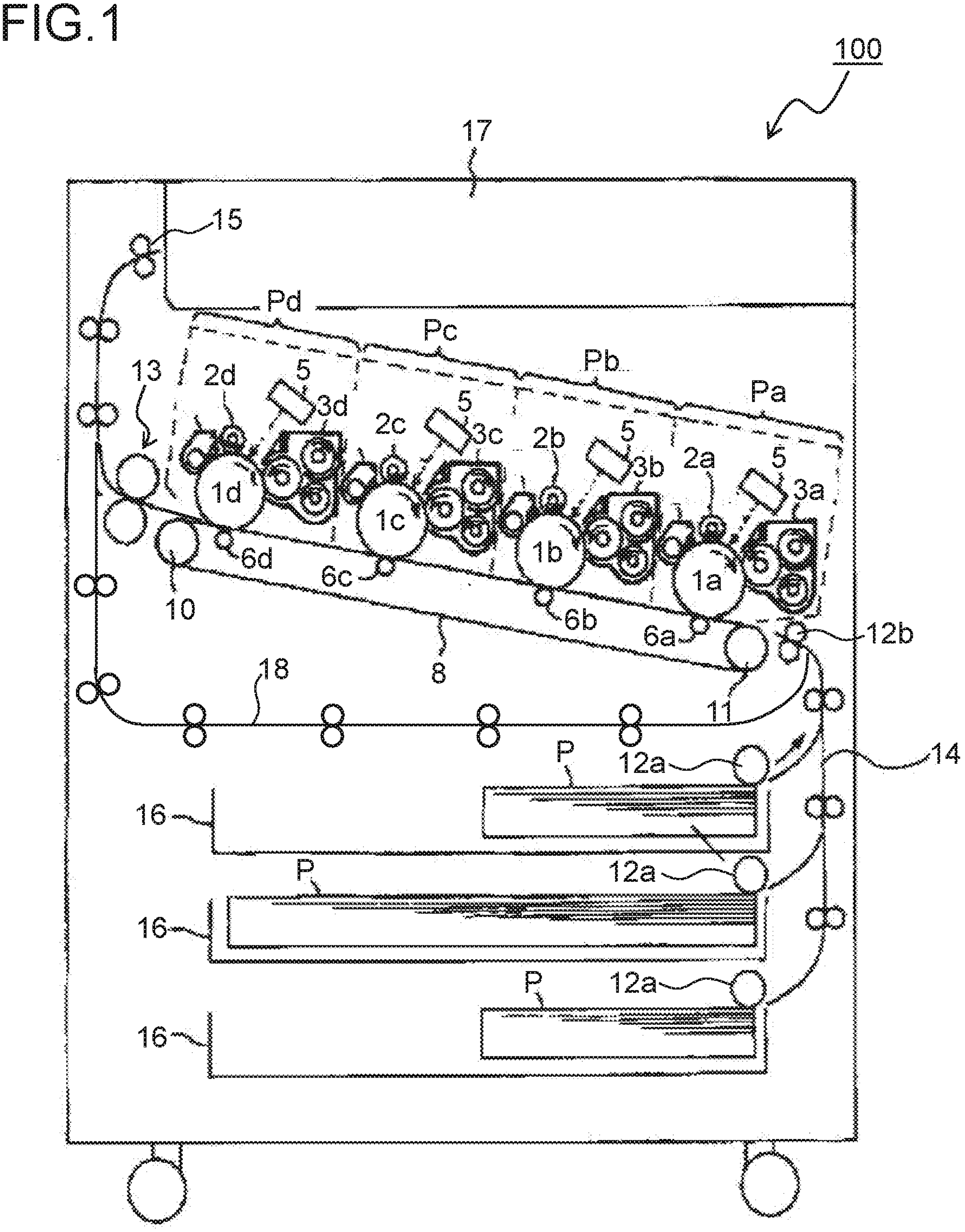
FIG. 1 is a schematic sectional view of an overall configuration of an image forming apparatus incorporating development devices according to the present disclosure.

Now, an embodiment of the present disclosure will be described with reference to the accompanying drawings. FIG. 1 is a schematic sectional view of an image forming apparatus 100 incorporating development devices 3_a_ to 3_d_ according to the present disclosure and, here, a tandem type color printer is taken as an example. In the body of the image forming apparatus 100, four image forming portions Pa, Pb, Pc, and Pd are provided in the order from Pa to Pd, from upstream in a conveyance direction (right in FIG. 1). These image forming portions Pa to Pd are disposed so as to correspond to images of four different colors (yellow, cyan, magenta, and black) and sequentially form a yellow, a cyan, a magenta, and a black image respectively, each through the processes of electrostatic charging, exposure to light, image development, and image transfer.

In the image forming portions Pa to Pd, photosensitive drums 1*a*, 1*b*, 1*c*, and 1*d* are provided, which carry visible images (toner images) of the different colors. In addition, an intermediate transfer belt 8 that rotates clockwise in FIG. 1 is disposed adjacent to the image forming portions Pa to Pd.

When image data is fed in from a host device such as a personal computer, first, charging devices 2*a* to 2*d* electrostatically charge the surfaces of the photosensitive drums 1*a* to 1*d* evenly. Next, an exposure device 5 irradiates the surfaces of the photosensitive drums 1*a* to 1*d* to light based on the image data to form electrostatic latent images based on the image data on the photosensitive drums 1*a* to 1*d*. The development devices 3*a* to 3*d* are loaded with predetermined amounts of two-component developer (hereinafter also referred to simply as "developer") containing toner of different colors, namely yellow, cyan, magenta, and black, supplied from toner containers 4*a* to 4*d* along with magnetic carrier. The toner in the developer is fed by the development devices 3*a* to 3*d* to the photosensitive drums 1*a* to 1*d* so as to electrostatically attach to them. In this way, toner images based on the electrostatic latent images formed by exposure to light from the exposure device 5 are formed.

Then, primary transfer rollers 6*a* to 6*d* produce an electric field with a predetermined transfer voltage between the primary transfer rollers 6*a* to 6*d* and the photosensitive drums 1*a* to 1*d* so as to primarily transfer the yellow, cyan, magenta, and black toner images on the photosensitive drums 1*a* to 1*d* to the intermediate transfer belt 8. The toner and the like left on the surfaces of the photosensitive drums 1*a* to 1*d* after primary transfer are removed by cleaning devices 7*a* to 7*d*.

Transfer sheets P to which the toner images are to be transferred are stored in a sheet cassette 16 disposed in a lower part in the image forming apparatus 100. A transfer sheet P is conveyed, with predetermined timing, via a sheet feed roller 12*a* and a pair of registration rollers 12*b* to a nip portion (secondary transfer nip portion) between a secondary transfer roller 9 provided adjacent to the intermediate transfer belt 8 and the intermediate transfer belt 8. The transfer sheet P having the toner images secondarily transferred to it is conveyed to a fixing portion 13.

The transfer sheet P conveyed to the fixing portion 13 is heated and pressed by passing through a nip portion between a fixing belt and a pressing roller, so that the toner images are fixed to the surface of the transfer sheet P to form a predetermined full-color image. The transfer sheet P having the full-color image formed on it is as it is (or after being sorted by a branching portion 14 to a reversing conveyance passage 18 and having images formed on both sides) discharged by a pair of discharging rollers 15 to a discharge tray 17.

Figure 2:
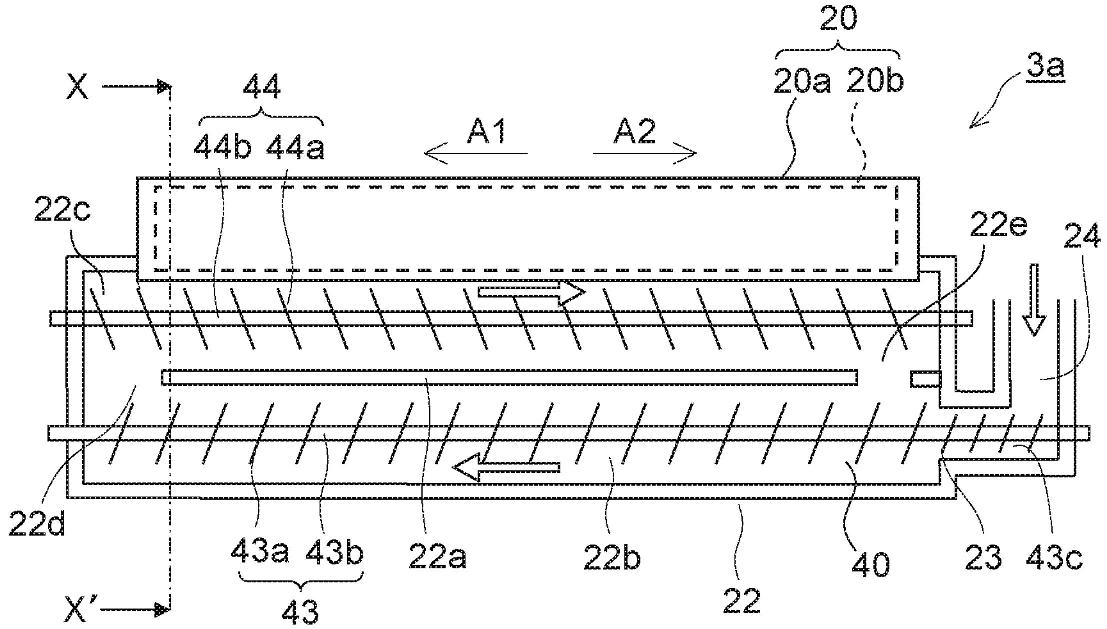
FIG. 2 is a side sectional view of the structure of a stirring portion in a development device according to one embodiment of the present disclosure.

FIG. 2 is a vertical sectional view of the structure of a stirring portion in the development device 3*a* according to one embodiment of the present disclosure incorporated in the image forming apparatus 100. Note that while, here, a description is given of the development device 3*a* disposed in the image forming portion Pa in FIG. 1, since the development devices 3*b* to 3*d* disposed in the image forming portions Pb to Pd have basically a similar configuration, no description will be given of them. Also, for convenience of description, in FIG. 2, a development roller 20 is shown with its position shifted to above a first conveyance chamber 22*b*.

As shown in FIG. 2, the development device 3*a* includes a development roller (developer carrying member) 20, a first spiral (first stirring-conveyance member) 43, a second spiral (second stirring-conveyance member) 44, and a developer container 22. The developer container 22 constitutes the outline of the development device 3*a* and includes a partition portion 22*a*, a first conveyance chamber 22*b*, a second conveyance chamber 22*c*, a first communication portion 22*d*, and a second communication portion 22*e* formed to it. The first and second conveyance chambers 22*b* and 22*c* store two-component developer constituted with magnetic carrier and toner. The developer container 22 rotatably holds the first spiral 43, the second spiral 44, and the development roller 20.

The partition portion 22*a* extends along the longitudinal direction of the developer container 22 and divides it such that the first and second conveyance chambers 22*b* and 22*c* are disposed one above the other. The first and second communication portions 22*d* and 22*e* are formed in the partition portion 22*a* at one and the other sides, respectively, along the longitudinal direction (i.e., the downstream side in A1 direction and the downstream side in A2 direction). The first communication portion 22*d* makes the first and second conveyance chambers 22*b* and 22*c* communicate with each other at their downstream end parts in A1 direction (first direction). The second communication portion 22*e* makes the first and second conveyance chambers 22*b* and 22*c* communicate with each other at their downstream end parts in A2 direction (second direction). The developer circulates through the first conveyance chamber 22*b*, the first communication portion 22*d*, the second conveyance chamber 22*c*, and the second communication portion 22*e*.

The first spiral 43 is disposed in the first conveyance chamber 22*b*. The first spiral 43 has a rotation shaft 43*b* rotatably supported on the developer container 22, and a first helical blade 43*a* provided unitarily with the rotation shaft 43*b* and formed in a helical shape with a constant pitch along the axial direction of the rotation shaft 43*b*. The first spiral 43 rotates in a predetermined direction (counterclockwise in FIG. 3) by being driven by an unshown driving mechanism. By rotating in a predetermined direction, the first helical blade 43*a* conveys, while stirring, the developer in the first conveyance chamber 22*b* in A1 direction (to one side of the development roller 20 along its axial direction).

In the end face of the first conveyance chamber 22*b* in A2 direction, a toner feed port 23 is provided through which toner is fed into the developer container 22. The toner feed port 23 is connected to a toner feeding passage 24 provided continuously with the toner container 4*a* (see FIG. 1). The rotation shaft 43*b* is disposed through the toner feed port 23 into the toner feeding passage 24. To part of the rotation shaft 43*b* disposed inside the toner feeding passage 24, a feeding blade 43*c* is formed unitarily with the rotation shaft 43*b* in a helical shape with a constant pitch along its axial direction. The feeding blade 43*c* is formed as a blade in a helical shape that winds in the same direction (with the same phase) as the first helical blade 43*a*. The feeding blade 43*c* is formed with a pitch and a diameter smaller than those of the first helical blade 43*a*.

The second spiral 44 is disposed in the second conveyance chamber 22*c*. The second spiral 44 has a rotation shaft 44*b* rotatably supported on the developer container 22 parallel to the rotation shaft 43*b*, and a second helical blade 44*a* provided unitarily with the rotation shaft 44*b* and formed in a helical shape as a blade winding in the opposite direction (with the opposite phase) to the first helical blade 43*a* The second spiral 44 rotates in a predetermined direction (counterclockwise in FIG. 3) by being driven by an unshown driving mechanism. By rotating in the same direction as the first helical blade 43*a*, the second helical blade 44*a* supplies, while stirring and conveying the developer in the second conveyance chamber 22*c* in A2 direction (in the direction opposite to A1 direction), the developer to the development roller 20.

By stirring the developer, the first and second spirals 43 and 44 electrostatically charge the toner in the developer to a predetermined level. Thus, the toner is held by the carrier. As the first and second spirals 43 and 44 rotate, the developer is conveyed through one of the communication portions (first communication portion 22*d*) provided in the partition portion 22*a* to the second spiral 44, and is conveyed through the other of the communication portions (the second communication portion 22*e*) to the first spiral 43, so that the developer circulates through the first and second conveyance chambers 22*b* and 22*c*. Then, the developer is fed from the second spiral 44 to the development roller 20 and a magnetic brush is formed on the development roller 20.

The development roller 20 includes a development sleeve 20*a* rotatably supported on the developer container 22 and a magnetic member 20*b* that is fixed to a fixed shaft (not shown) in the development sleeve 20*a* and that has a plurality of magnetic poles. The development sleeve 20*a* rotates in the direction indicated by an arrow in FIG. 3 (counterclockwise) by being driven by an unshown driving mechanism. In addition, the development sleeve 20*a* is fed with a development voltage having an alternating-current voltage superposed on a direct-current voltage.

In the development device 3*a*, as shown in FIG. 2, the developer in the first conveyance chamber 22*b* is stirred and conveyed by the first spiral 43 in A1 direction (toward the first communication portion 22*d*) and gradually accumulates in one side of the first conveyance chamber 22*b*. In the one side of the first conveyance chamber 22*b*, the developer is pushed by the following developer to be pushed up via the first communication portion 22*d* into the second conveyance chamber 22*c*. The developer in the second conveyance chamber 22*c* is fed, while being stirred and conveyed by the second spiral 44 in A2 direction (toward the second communication portion 22*e*), to the development roller 20. The developer conveyed to the other side of the second conveyance chamber 22*c* falls via the second communication portion 22*e* into the first conveyance chamber 22*b*.

Figure 3:
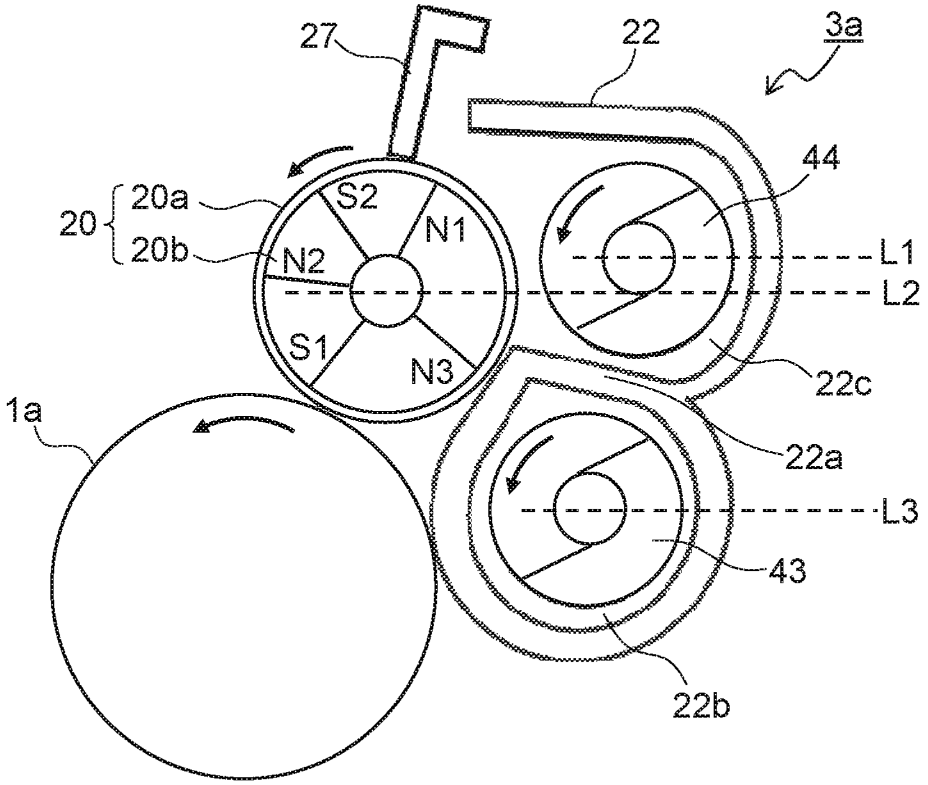
FIG. 3 is a vertical sectional view of the development device according to the embodiment as cut along the direction orthogonal to its longitudinal direction.

FIG. 3 is a vertical sectional view (sectional view from the direction indicated by arrows X and X' in FIG. 2) of the development device 3*a* according to the embodiment as cut along the direction orthogonal to the longitudinal direction. As shown in FIG. 3, the developer container 22 is fitted with a regulation blade 27. Specifically, the regulation blade 27 is fitted to the development roller 20 along its longitudinal direction (direction perpendicular to the plane of FIG. 3). Between a tip part of the regulation blade 27 and the outer circumferential surface of the development roller 20, a small gap (regulation gap) is provided, which constitutes a regulation portion. As the development sleeve 20*a* rotates, the developer (the magnetic brush) passes through the regulation portion, so that the layer thickness of the developer carried on the surface of the development roller 20 is regulated. In the embodiment, as the regulation blade 27, a magnetic blade made of stainless steel (SUS430) is used.

The magnetic member 20*b* in the development roller 20 has, along the rotation direction (counterclockwise in FIG. 3) of the development sleeve 20*a*, a regulation pole (attracting pole) N1 disposed in a region opposite the regulation blade 27 (i.e., a regulation portion), a main pole S1 disposed in a region opposite the photosensitive drum 1*a* (i.e., a development region), and a release pole N3 that releases the developer carried on the development roller 20. The magnetic member 20*b* is configured to have five poles including conveyance poles N2 and S2 disposed between the regulation pole (attracting pole) N1 and the main pole S1. The regulation pole N1 serves also as an attracting pole that attracts the developer onto the development roller 20 and thus it has a magnetic pole width (central angle) greater than the other magnetic poles. When a driving force is fed to the development device 3*a*, while the development sleeve 20*a* rotates, the magnetic member 20*b* does not rotate.

A magnetic field in an attracting direction is produced between the regulation pole N1 of the magnetic member 20*b* and the regulation blade 27, so that a magnetic brush composed of chains of particles of developer is formed between the regulation blade 27 and the development roller 20. As the magnetic brush passes across the regulation blade 27 (regulation portion), its layer thickness is regulated to a desired height. Then, as the development sleeve 20*a* rotates counterclockwise, the conveyance poles S2 and N2 produce a magnetic field in a direction along the outer circumferential surface of the development sleeve 20*a*, so that the magnetic brush moves to the development region. The main pole S1 produces a magnetic field in an attracting direction between the main pole S1 and the photosensitive drum 1*a*, so that the magnetic brush is brought into contact with the surface of the photosensitive drum 1*a* to develop an electrostatic latent image. The toner unused in development is collected by the magnetic brush on the development sleeve 20*a*.

As the development sleeve 20*a* rotates further counterclockwise, by a repelling magnetic field between the release pole N3 and the regulation pole (attracting pole) N1, the magnetic brush is released from the development roller 20 to be collected in the second conveyance chamber 22*c*. After the developer is stirred and conveyed by the second spiral 44, a magnetic brush is formed on the development sleeve 20*a* again by a magnetic field produced by the regulation pole (attracting pole) N1.

In the development device 3*a* according to the embodiment, the second conveyance chamber 22*c* is disposed above the first conveyance chamber 22*b*. In other words, the first and second conveyance chambers 22*b* and 22*c* are disposed one above the other. This allows the size reduction of the development device 3*a* in the horizontal direction. Since, in the image forming apparatus 100, the four development devices 3*a* to 3*d* are disposed in the horizontal direction, reducing the sizes of the development devices 3*a* to 3*d* is especially effective in the size reduction of the image forming apparatus 100. In addition, the development roller 20 is disposed below the second spiral 44 in the second conveyance chamber 22*c*. This allows the size reduction of the development device 3*a* in the vertical direction as well.

The development device 3*a* according to the embodiment is configured such that developer is fed from the second spiral 44 in the second conveyance chamber 22*c* to the development roller 20 and that the developer having passed through the development region and having the toner in it consumed in development is collected in the second conveyance chamber 22*c* in which the second spiral 44 is disposed As shown in FIG. 3, when the straight line horizontally passing through the center of the rotation shaft 44*b* of the second spiral 44 in the second conveyance chamber 22*c* is identified as L1, the straight line horizontally passing through the rotation center of the development roller 20 is identified as L2, and the straight line horizontally passing through the center of the rotation shaft 43*b* of the first spiral 43 in the first conveyance chamber 22*b* is identified as L3, then L2 is positioned below L1 and L3 is positioned below L2.

Figure 4:
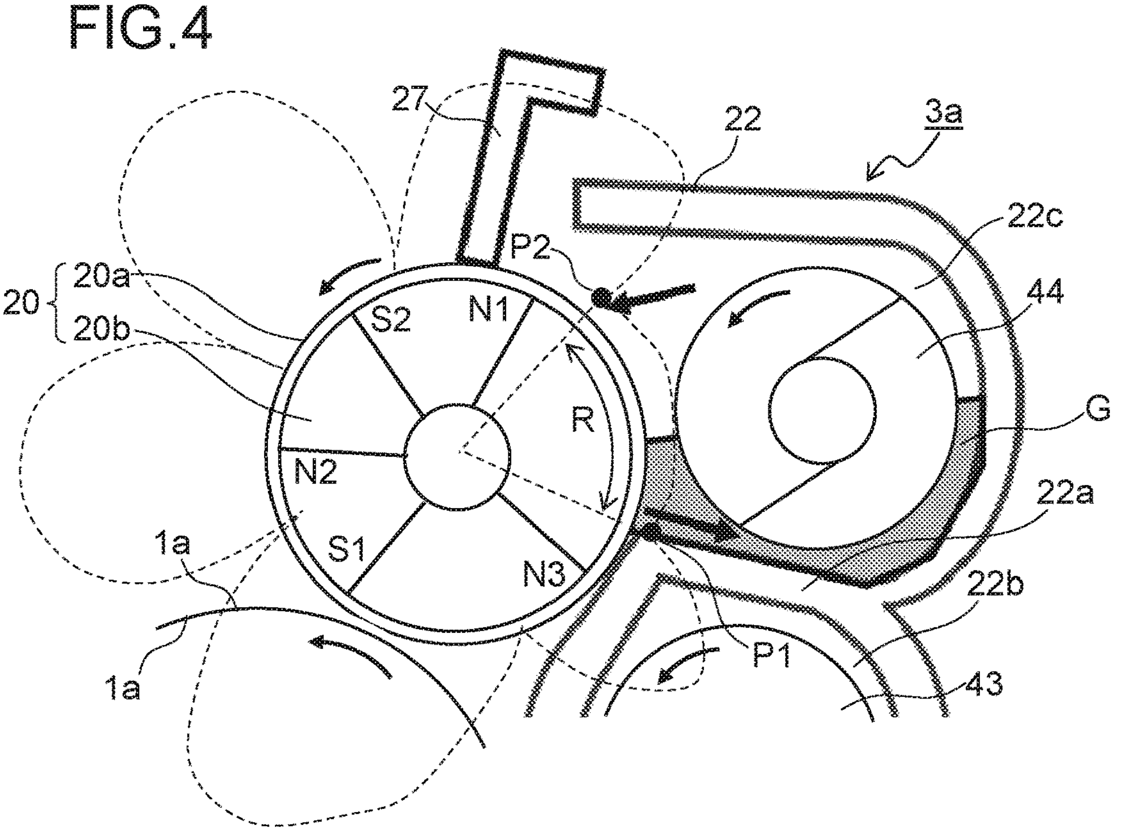
FIG. 4 is an enlarged sectional view around a second conveyance chamber in FIG. 3 showing the distribution of the magnetic flux density and a developer releasing region around a magnetic member in a development roller.

FIG. 4 is an enlarged sectional view around the second conveyance chamber 22*c* in FIG. 3. With reference to FIG. 4, a description will now be given of the distribution of the magnetic flux density and a developer releasing region R around the magnetic member 20*b* in the development roller 20.

In the development device 3*a* according to the embodiment, the point P1 at which the magnetic flux density of the release pole N3 releasing the developer on the development roller 20 after its passage through the development region becomes 5 mT or less (i.e., the position between the release pole N3 and the attracting pole N1 where the peak magnetic flux density of the release pole N3 falls) is taken as a release start position. Moreover, the region where the magnetic flux density between the release pole N3 and the attracting pole N1 in the development roller 20 is 5 mT or less is taken as a developer releasing region R. Further, the point P2 at which the magnetic flux density of the attracting pole N1 attracting the developer onto the development roller 20 after its passage through the developer releasing region R becomes 5 mT or more (i.e., the position between the release pole N3 and the attracting pole N1 where the peak magnetic flux density of the attracting pole N1 rises) is taken as an attraction start position.

The release start position P1 is below the straight line L1, at the same height as the top face of the partition portion 22*a*. Since, with this configuration, developer is separate (is released) from the development roller 20 at a lower part of the second spiral 44 in the second conveyance chamber 22*c*, the developer separated from the development roller 20 is collected into a part in the second conveyance chamber 22*c* loaded with developer G. Thus, it is possible to effectively prevent the scattering of toner through the gap between the development roller 20 and the developer container 22.

The attraction start position P2 is located below a top end part of the second spiral 44. With this configuration, the developer stirred by the second spiral 44 is easily fed to the development roller 20 by the attracting pole N1. Thus, it is possible to stably form a magnetic brush on the development roller 20.

Now, a description will be given of the relationship of the width (central angle) of the developer releasing region R and the peak magnetic flux density of the attracting pole (regulation pole) N1 versus developer release performance. The narrower the width of the developer releasing region R and the stronger the peak magnetic flux density of the attracting pole N1, the poorer the release of developer. Specifically, the developer released in the developer releasing region R is immediately attracted by the attracting pole N1, so that developer with a low toner concentration is used in development. As will be discussed later in connection with an example, when the releasing region width is represented by X [° ] and the peak magnetic flux density of the attracting pole N1 is represented by Y [mT], with a design that satisfies formula (I) below, it is possible to achieve satisfactory release of developer with a low toner concentration after use in development and attraction of the developer with a stable toner concentration after sufficient stirring in the second conveyance chamber 22*c*.

$$Y \leq 2.1X - 32.7 \quad (1)$$

While a wider developer releasing region R allows easier release, it is difficult to set the width (central angle) of the developer releasing region R to 60° or more due to restrictions on the layout of the development devices 3*a* to 3*d*. If the peak magnetic flux density of the attracting pole N1 is 30 mT or less, when the layer thickness of the developer (magnetic brush) is regulated by the regulation blade 27, the gap (regulation gap) between the regulation blade 27 and the development roller 20 has to be made small and this inconveniently increases the susceptibility to component tolerances and fitting tolerances of the regulation blade 27. In addition, if the peak magnetic flux density of the attracting pole N1 is 60 mT or more, when the magnetic brush passes through the regulation blade 27, the developer is subject to increased mechanical stress and this inconveniently reduces the durability of the developer in terms of long-time use.

Out of these considerations, with a design that satisfies formulae (2) and (3) below, it is possible to design development devices 3*a* to 3*d* which provide improved stability of a magnetic brush and improved durability of developer while keeping satisfactory release of developer.

$$X \leq 60 \quad (2)$$

$$30 \leq Y \leq 60 \quad (3)$$

The above embodiment is not meant as any limitation on the present disclosure and thus various modifications can be made without departing from the spirit of the present disclosure. For example, while the embodiment deals with an example in which the developer is fed from the second spiral 44 to the development roller 20, this is not meant as any limitation on the present disclosure. For example, a configuration is possible where a magnetic roller (developer carrying member) is disposed adjacent to the second spiral 44 so as to feed developer from the second spiral 44 to the magnetic roller and then feed toner from the magnetic roller to the development roller (toner feeding member).

While, in the above embodiment, the regulation pole N1 is given a large magnetic pole width for use as an attracting pole as well, a separate attracting pole can be provided upstream of the regulation pole N1 with respect to the rotation direction of the development roller 20. Further, while, in the above embodiment, two conveyance poles N2 and S2 are provided, one or three or more conveyance poles can be disposed.

The present disclosure finds applications, not only in color printers employing an intermediate transferring system like the one shown in FIG. 1 but also in various image forming apparatuses incorporating a development device including a first conveyance chamber and a second conveyance chamber disposed above the first conveyance chamber, such as color printers employing a direct transfer system including, instead of the intermediate transfer belt 8 and a secondary transfer roller 9, a conveyance belt, or monochrome copiers, color copiers, and facsimile machines of a digital or analogue type. Now, by way of an example the effects of the present disclosure will be described in further detail.

EXAMPLE

Relationship of Width of Developer Releasing Region and Peak Magnetic Flux Density of Attracting pole Versus Developer Release Performance: Tests were conducted to examine the release of developer in the developer releasing region R while the width (central angle) of the developer releasing region R and the peak magnetic flux density of the attracting pole (regulation pole) N1 were varied.

As a testing machine, an image forming apparatus 100 (manufactured by KYOCERA Document Solutions Japan Inc.) as shown in FIG. 1 was used and the sheet conveyance rate (process linear velocity) was 195 mm/sec. The outer diameter of the development roller 20 was 16 mm and the linear velocity ratio of the development roller 20 to the photosensitive drums 1*a* to 1*d* was 1.8. The gap (regulation gap) between the development roller 20 and the regulation blade 27 was 0.40 mm, and the gap (development gap) between the photosensitive drums 1*a* to 1*d* and the development roller 20 was 0.34 mm.

Figure 5:
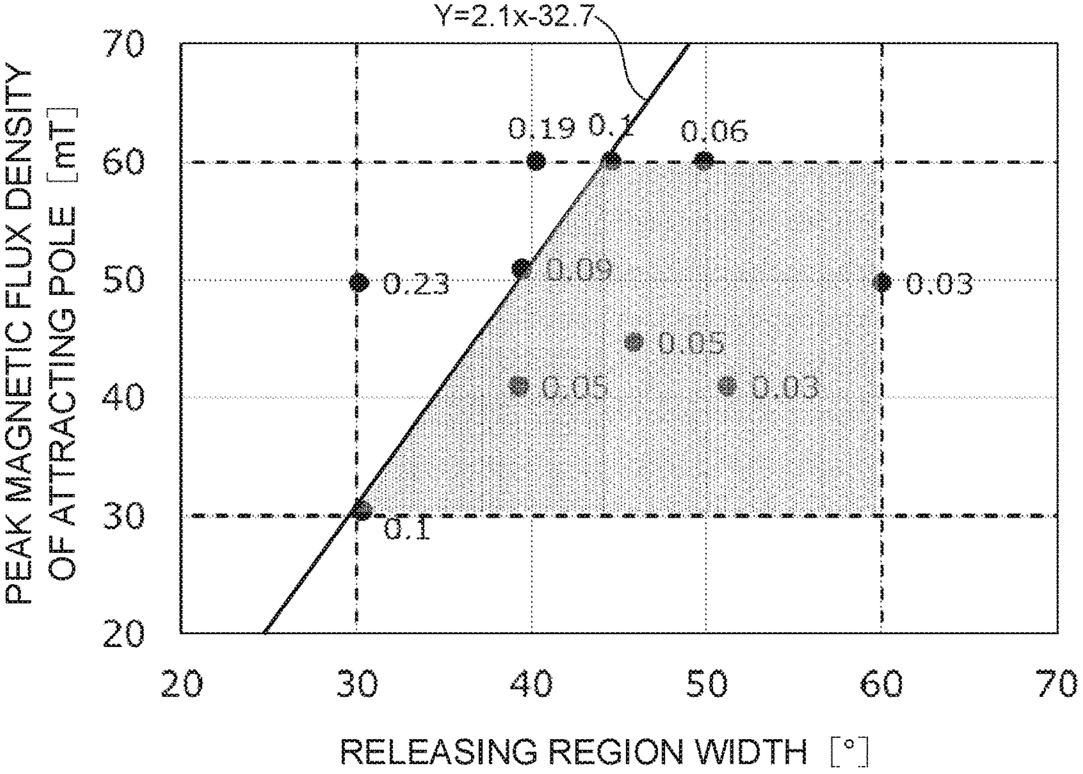
FIG. 5 is a graph showing the results of tests on developer release performance with the releasing region width [° ] and the peak magnetic flux density of an attracting pole varied.

To evaluate the developer release performance, a solid image was printed out while the width (central angle) of the developer releasing region R and the peak magnetic flux density of the attracting pole (regulation pole) N1 were varied among a plurality of levels, and the density difference ΔID between the leading edge and the trailing edge of the image was measured with an image densitometer. If the release of developer is poor, developer with consumed toner (i.e., with a low toner density) is used at the trailing edge of the image, and thus the image density there is lower than that at the leading edge of the image. In other words, poor release of developer yields a large ΔID. The target value of ΔID was set at 0.10 or less and the relationship between the width (central angle) of the developer releasing region R and the peak magnetic flux density of the attracting pole N1 that satisfied the target value was determined. The results are shown in FIG. 5. In FIG. 5, the values beside the plotted dots are values of ΔID.

As shown in FIG. 5, the narrower the width (central angle) of the developer releasing region R and the stronger the peak magnetic flux density of the attracting pole N1, the poorer the release of the developer, and thus the larger the value of ΔID. When the width (central angle) of the developer releasing region R is represented by X [°] and the peak magnetic flux density of the attracting pole N1 is represented by Y [mT], ΔID can be the targeted 0.10 or less in the region that satisfies the relationship $Y \leq 2.1X - 32.7$ (i.e., in the region on the right of the straight line L4 in FIG. 5).

In addition, the region that satisfies the relationships $X \leq 60$ and $30 \leq Y \leq 60$ (i.e., in the hatched region in FIG. 5) is a feasible design region OW (operation window) for development devices 3*a* to 3*d*. It was confirmed that, within the region, it was possible to achieve satisfactory developer release performance, improved stability of the magnetic brush, and improved durability of developer.

Note that, with any configuration that satisfies the relationship $Y \leq 2.1X - 32.7$, there is no risk of the developer released in the developer releasing region R being immediately attracted by the attracting pole N1 and used in development. In addition, a configuration that satisfies the relationships $X \leq 60$ and $30 \leq Y \leq 60$ provides improved stability of a magnetic brush and improved durability of developer. Accordingly, regardless of variations in the development conditions such as the outer diameter of the development roller 20, the linear velocity ratio of the development roller 20 to the photosensitive drums 1*a* to 1*d*, the regulation gap, and the development gap, so long as formulae (1) to (3) are satisfied, it is possible to achieve desired performance and effects.

The present disclosure finds applications in development devices including a first conveyance chamber and a second conveyance chamber disposed above the first conveyance chamber. Based on the present disclosure, it is possible to provide a development device that can achieve satisfactory release of developer without increasing its size, and to provide an image forming apparatus incorporating the same.

What is claimed is:

1. A development device developing an electrostatic latent image formed on an image carrying member into a toner image, comprising:

a developer container including a first conveyance chamber and a second conveyance chamber disposed above the first conveyance chamber across a partition portion, the developer container storing two-component developer containing carrier and toner;

a first stirring-conveyance member rotatably supported in the first conveyance chamber, the first stirring-conveyance member conveying, while stirring, developer in the first conveyance chamber in a first direction;

a second stirring-conveyance member rotatably supported in the second conveyance chamber parallel to the first stirring-conveyance member, the second stirring-conveyance member conveying, while stirring, developer in the second conveyance chamber in a second direction opposite to the first direction;

a developer carrying member rotatably supported on the developer container, the developer carrying member carrying on a surface thereof the developer in the second conveyance chamber; and a regulation blade disposed opposite the developer carrying member, the regulation blade regulating a layer thickness of the developer on the developer carrying member, wherein the first conveyance chamber is isolated from the developer carrying member by a separating wall extending downward from the partition portion, feeding of the developer to the developer carrying member and collection of the developer from the developer carrying member are carried out in the second conveyance chamber, the developer carrying member includes:

a development sleeve rotatable and in a cylindrical shape; and a magnetic member fixed inside the development sleeve so as not to be rotatable, the magnetic member having, along a rotation direction of the development sleeve, a plurality of magnetic poles including a regulation pole opposite the regulation blade, a main pole opposite the image carrying member, a release pole releasing the developer carried on the developer carrying member, and an attracting pole attracting the developer onto the developer carrying member, and a release start position at which a magnetic flux density of the release pole becomes 5 [mT] or less is below a straight line L1 horizontally passing through a center of a rotation shaft of the second stirring-conveyance member and, when a central angle of a developer releasing region where a magnetic flux density between the release pole and the attracting pole is 5 [mT] or less is represented by X [° ] and a peak magnetic flux density of the attracting pole is represented by Y [mT], formula (1) below is satisfied:

$$Y \leq 2.1X - 32.7. \quad (1)$$

2. The development device according to claim 1, wherein formula (2) below is satisfied:

$$X \leq 60. \quad (2)$$

3. The development device according to claim 1, wherein formula (3) below is satisfied:

$$30 \leq Y \leq 60. \quad (3)$$

4. The development device according to claim 1, wherein the straight line L1 is positioned above a straight line L2 horizontally passing through a rotation center of the developer carrying member and the straight line L2 is positioned above a straight line L3 horizontally passing through a center of a rotation shaft of the first stirring-conveyance member.

5. The development device according to claim 1, wherein the release start position, which is a position between the release pole and the attracting pole where a peak magnetic force of the release pole falls is at a same height as a top face of the partition portion.

6. The development device according to claim 1, wherein an attraction start position that is a position between the release pole and the attracting pole where the peak magnetic force of the attracting pole rises is positioned below a top end part of the second stirring-conveyance member.

7. An image forming apparatus comprising the development device according to claim 1.

* * * * *